Aug. 30, 1927.
W. HOUSTON
PIE PLATE ATTACHMENT
Filed April 19, 1927
1,640,409
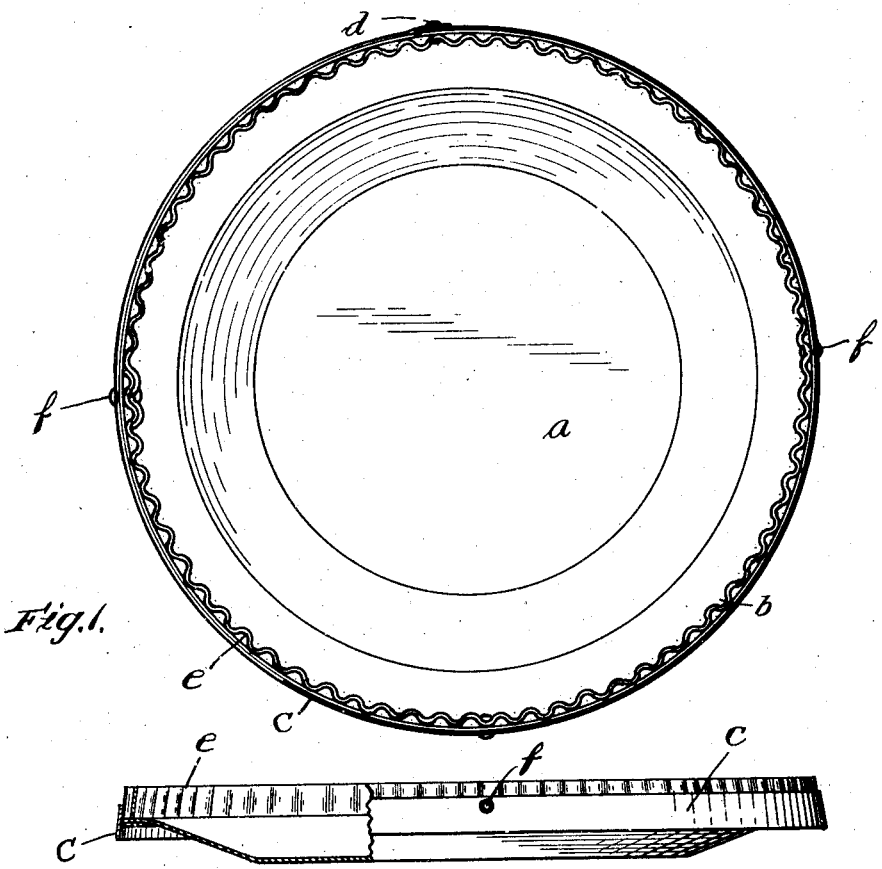
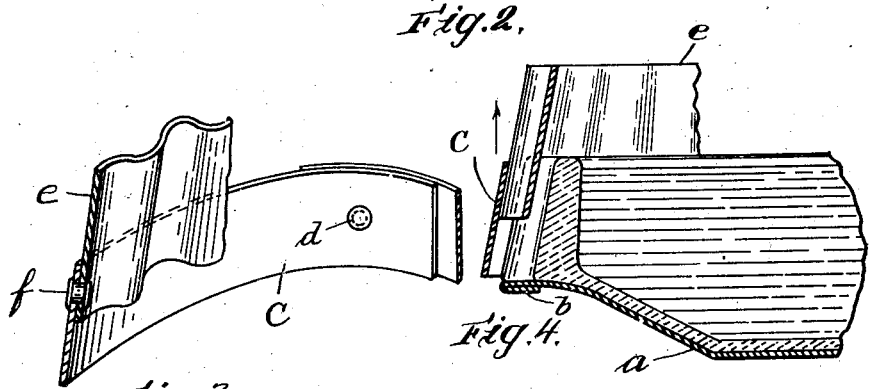
Inventor,
William Houston
by L. H. Harriman
Atty.

Patented Aug. 30, 1927.

1,640,409

UNITED STATES PATENT OFFICE.

WILLIAM HOUSTON, OF HAVERHILL, MASSACHUSETTS.

PIE-PLATE ATTACHMENT.

Application filed April 19, 1927. Serial No. 184,874.

This invention relates to improvements in attachments for the rims of pie plates principally used in baking pies having a filling which, previous to baking, is freely fluid, as, for example, a filling of custard and squash. In making pies of this character it is customary to build up the pie crust dough about the edge of the plate, to form a thick rim which is of sufficient strength to retain the liquid filling until the latter becomes thickened by the baking process, and considerable loss is often caused by the rim of dough giving way during the baking process, permitting the filling to escape.

Prior to my invention it has been attempted to obviate this difficulty by providing a supplemental rim, which is adapted to be mounted on the plate rim in a position to reinforce the rim of dough, but these devices have been found to be unsatisfactory, partly because of the difficulty of attaching and removing the same, and partly because of their cost of manufacture.

The objects of my invention are to provide an attachment of the above described character, which is adapted to be readily placed in position on the plate rim and to be as readily removed therefrom after baking, without disturbing the pie crust rim, which will enable the rim of dough to be quickly built and will be effective in retaining it in position, and which may be manufactured at small expense.

I accomplish these objects by means of the construction hereinafter described and illustrated in the accompanying drawing in which:

Fig. 1 is a plan view showing a pie plate provided with a preferred embodiment of my invention.

Fig. 2 is an elevation thereof, partly in central section.

Fig. 3 is a detail sectional view of the attachment on an enlarged scale.

Fig. 4 is a similar view illustrating the operation of removing the attachment.

In the drawing $a$ indicates an ordinary circular pie plate having a rim portion $b$, the portion thereof adjacent the edge being nearly flat and horizontal, as is customary.

According to my invention, I provide a narrow, flat strip $c$ of sheet metal, of uniform width, which is bent into circular form and has its ends connected in any suitable manner, as by having them overlapped and connected by a rivet $d$, as shown in Fig. 3, the internal diameter of the ring thus formed being slightly greater than the external diameter of the plate at its edge, so that the ring may be easily passed thereon, so as to enclose the same.

I further provide a second strip of sheet metal $e$, ordinary tin being preferable in both instances, which will ordinarily be of slightly greater width than the strip $c$, said strip being crimped into wavy or fluted form, by being passed between the fluted rolls, the waves or flutes being made slightly deeper at one edge than at the other. The crimped strip is bent into circular form and placed within the ring $c$, against the inner side thereof, so as to overlap one edge portion only, and is permanently secured thereto by rivets $f$ which will be passed at suitable intervals through the bottoms of the flutes which engage the surface of the ring $c$, the ends of the fluted strip being slightly overlapped and secured by the rivets, as indicated in Fig. 1, so as to form a continuous ring. In assembling the ring $c$ and the fluted strip, the edge portion thereof which is fluted the lesser depth is attached to the ring, so that, when these parts are finally assembled the fluted strip will extend laterally from the ring at a slight inward inclination.

The device thus formed, will be placed in position on the plate by simply passing the ring $c$, while held in parallel relation to the plate, down over the rim of the plate, so that the ends of the flutes, or lower edge of the fluted strip $e$, will seat on the approximately flat horizontal surface of the plate rim at the edge thereof, as indicated in Fig. 2. A sufficiently tight connection is thereby formed between the fluted rim and the plate to retain the dough, which, when placed on the plate, will be built up against the fluted ring, so that the edge of the rim of dough will be moulded in a corresponding fluted form.

The filling will then be placed in the plate and the baking operation performed, and, as the rim of dough is effectively reinforced, all possibility that it will break away is avoided. When the baking operation is finished, the whole attachment will be lifted vertically from the plate, the slight inward inclination of the fluted portion enabling the removing operation to be performed without in any way disturbing the rim of crust, as indicated in Fig. 4.

The device above described may obviously be made at small expense and the fact that it may be readily placed in position and removed makes it particularly valuable from a practical standpoint.

I claim:

1. A pie plate attachment comprising a continuous flat metal ring formed to be removably fitted to the edge of the plate rim and to extend above the surface thereof and a transversely fluted metal strip enclosed within and secured to one edge portion of the inner surface of the ring and having its ends meeting, to permit the opposite edge portion of the ring to form a retaining flange adapted to be passed onto the plate rim from above the same and to be supported thereon by the engagement of the adjacent edge of the fluted strip with its top side.

2. A pie plate attachment comprising a flat metal ring having a greater internal diameter than the greatest diameter of the rim of the plate in connection with which it is to be used and a fluted metal ring having one edge portion enclosed within one edge portion of the flat ring, so that said edge portions overlap and the opposite edge portions project one beyond the other, to permit the projecting edge portion of the flat ring to be passed down over the plate rim and the adjacent edge of the fluted ring to seat thereon.

In testimony whereof, I have signed my name to this specification.

WILLIAM HOUSTON.